US008047327B2

(12) United States Patent
Audeval

(10) Patent No.: US 8,047,327 B2
(45) Date of Patent: Nov. 1, 2011

(54) MUFFLER FOR PNEUMATIC HANDHELD TOOL

(75) Inventor: Georges Audeval, Mascouche (CA)

(73) Assignee: Audeval Solutions Inc., Mascouche (CA)

( * ) Notice: Subject to any disclaimer, the term of this patent is extended or adjusted under 35 U.S.C. 154(b) by 0 days.

(21) Appl. No.: 12/811,633

(22) PCT Filed: Dec. 31, 2008

(86) PCT No.: PCT/CA2008/002303
§ 371 (c)(1),
(2), (4) Date: Jul. 2, 2010

(87) PCT Pub. No.: WO2009/086619
PCT Pub. Date: Jul. 16, 2009

(65) Prior Publication Data

US 2010/0288581 A1 Nov. 18, 2010

Related U.S. Application Data

(60) Provisional application No. 61/018,990, filed on Jan. 4, 2008.

(51) Int. Cl.
*F01N 1/10* (2006.01)
*F01N 1/24* (2006.01)
*F01N 1/00* (2006.01)
*F01N 1/08* (2006.01)
*B23B 45/04* (2006.01)

(52) U.S. Cl. .................... 181/230; 173/168; 173/DIG. 2

(58) Field of Classification Search .................. 181/230, 181/252, 256, 258; 173/DIG. 2, 168, 169
See application file for complete search history.

(56) References Cited

U.S. PATENT DOCUMENTS

| | | | | | |
|---|---|---|---|---|---|
| 1,013,483 | A | * | 1/1912 | Gaa | 181/237 |
| 2,073,480 | A | | 3/1937 | Jimerson | |
| 2,453,240 | A | * | 11/1948 | Malmros | 181/230 |
| 3,270,834 | A | * | 9/1966 | Bratt | 181/230 |
| 3,323,615 | A | * | 6/1967 | Kessler | 181/230 |
| 3,380,553 | A | * | 4/1968 | Gibel | 181/230 |
| 3,719,251 | A | * | 3/1973 | Hedrick | 181/230 |
| 3,809,179 | A | | 5/1974 | Delaney, Jr. et al. | |
| 4,049,076 | A | | 9/1977 | Murphy | |
| 4,161,996 | A | * | 7/1979 | Dolejsi | 181/230 |
| 4,184,564 | A | * | 1/1980 | Trainor | 181/230 |
| 4,424,883 | A | * | 1/1984 | Musiani | 181/258 |
| 4,570,322 | A | * | 2/1986 | Dence | 29/402.17 |
| 5,022,469 | A | | 6/1991 | Westerberg | |
| 5,163,519 | A | * | 11/1992 | Mead et al. | 173/91 |
| 5,453,577 | A | * | 9/1995 | Everett et al. | 173/211 |
| 5,500,494 | A | * | 3/1996 | Ligman | 181/230 |

(Continued)

*Primary Examiner* — Edgardo San Martin
(74) *Attorney, Agent, or Firm* — Goudreau Gage Dubuc; Gonzalo Lavin

(57) ABSTRACT

A muffler for mounting to a handheld pneumatic tool, such as a die grinder. The muffler comprises a hollow open-ended casing having an inner wall lined with a thick layer of an insulating material. The muffler is sleeve mounted about a coupler positioned between an exhaust end of the pneumatic tool and an air adapter supplying compressed air to the pneumatic tool for operation thereof. A plate comprising a plurality of perforations is positioned at a first face of the casing adjacent the air adapter. A biasing member is further placed between the plate and the air adapter for biasing a second face of the casing against the exhaust end. In this manner, during operation of the pneumatic tool, released air expelled at the exhaust end is directed through the casing to reduce a level of the noise at the exhaust end.

18 Claims, 7 Drawing Sheets

U.S. PATENT DOCUMENTS

| | | | | | |
|---|---|---|---|---|---|
| 5,581,055 | A * | 12/1996 | Self et al. | 181/230 |
| 6,053,277 | A * | 4/2000 | Walker et al. | 181/254 |
| 6,089,346 | A * | 7/2000 | Tredinnick et al. | 181/230 |
| 6,196,331 | B1 * | 3/2001 | Naito et al. | 173/169 |
| 6,202,785 | B1 * | 3/2001 | Hilling et al. | 181/230 |
| 6,530,436 | B2 * | 3/2003 | Nowak et al. | 173/168 |
| 6,554,099 | B2 * | 4/2003 | Uegane | 181/275 |
| 6,668,971 | B2 * | 12/2003 | Sterling | 181/230 |
| 6,751,952 | B2 * | 6/2004 | Chen | 60/407 |
| 6,935,460 | B2 * | 8/2005 | McCombs et al. | 181/258 |
| 7,100,737 | B2 | 9/2006 | Sishtla | |
| 7,238,095 | B1 | 7/2007 | Sun et al. | |
| 7,261,181 | B2 * | 8/2007 | Sellers et al. | 181/230 |
| 7,398,836 | B2 * | 7/2008 | Elmvist et al. | 173/218 |
| 2004/0177980 | A1 | 9/2004 | Lucas | |
| 2008/0029281 | A1 | 2/2008 | Sun et al. | |

* cited by examiner

MUFFLER FOR PNEUMATIC HANDHELD TOOL

CROSS-REFERENCE TO RELATED APPLICATIONS

This application is a National Entry Application of PCT application no PCT/CA2008/002303 filed on Dec. 31, 2008 and published in English under PCT Article 21(2), which itself claims benefit of U.S. provisional application Ser. No. 61/018,990, filed on Jan. 4, 2008. All documents above are incorporated herein in their entirety by reference.

FIELD OF THE INVENTION

The present invention relates to a muffler for a pneumatic handheld tool.

BACKGROUND OF THE INVENTION

A die grinder is used to polish, grind or cut away small amounts of metal from a workpiece, for example to remove metal spurs after cutting a pipe. As known in the art, a major drawback of conventional pneumatic die grinders is the high level of noise created in use. Die grinders can range in size from small handheld to bench top models. When using a handheld model, the operator must keep a steady hold on the die grinder. Unfortunately, the size of the most common and least expensive handheld die grinders offer a gripping space suitable for one hand only.

To try to solve the noise problem, pneumatic handheld die grinders with internal mufflers are sold. However, they are expensive and since the muffler is an internal component, it cannot easily be replaced by the user.

What is therefore needed, and an object of the present invention, is a muffler that can be added as an external component to a pneumatic handheld die grinder, offering an extension of the gripping area in addition to a noise reduction.

SUMMARY OF THE INVENTION

More specifically, in accordance with the present invention, there is provided a muffler for mounting to each one of a plurality of handheld pneumatic tools, each one of the plurality of tools comprising a body with a tool attachment end and an exhaust end, and an air adapter in fluid communication with an interior of the body for supplying pressurized air thereto. The muffler comprises a hollow casing adapted to be mounted to each one of the plurality of tools with a first face of the casing adjacent the air adapter and a second face of the casing opposite the first face adjacent the exhaust end. A layer of insulating material lines an inner wall of the casing and a biasing member is mounted between the air adapter and the first face, the biasing member biasing the second face against the exhaust end.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
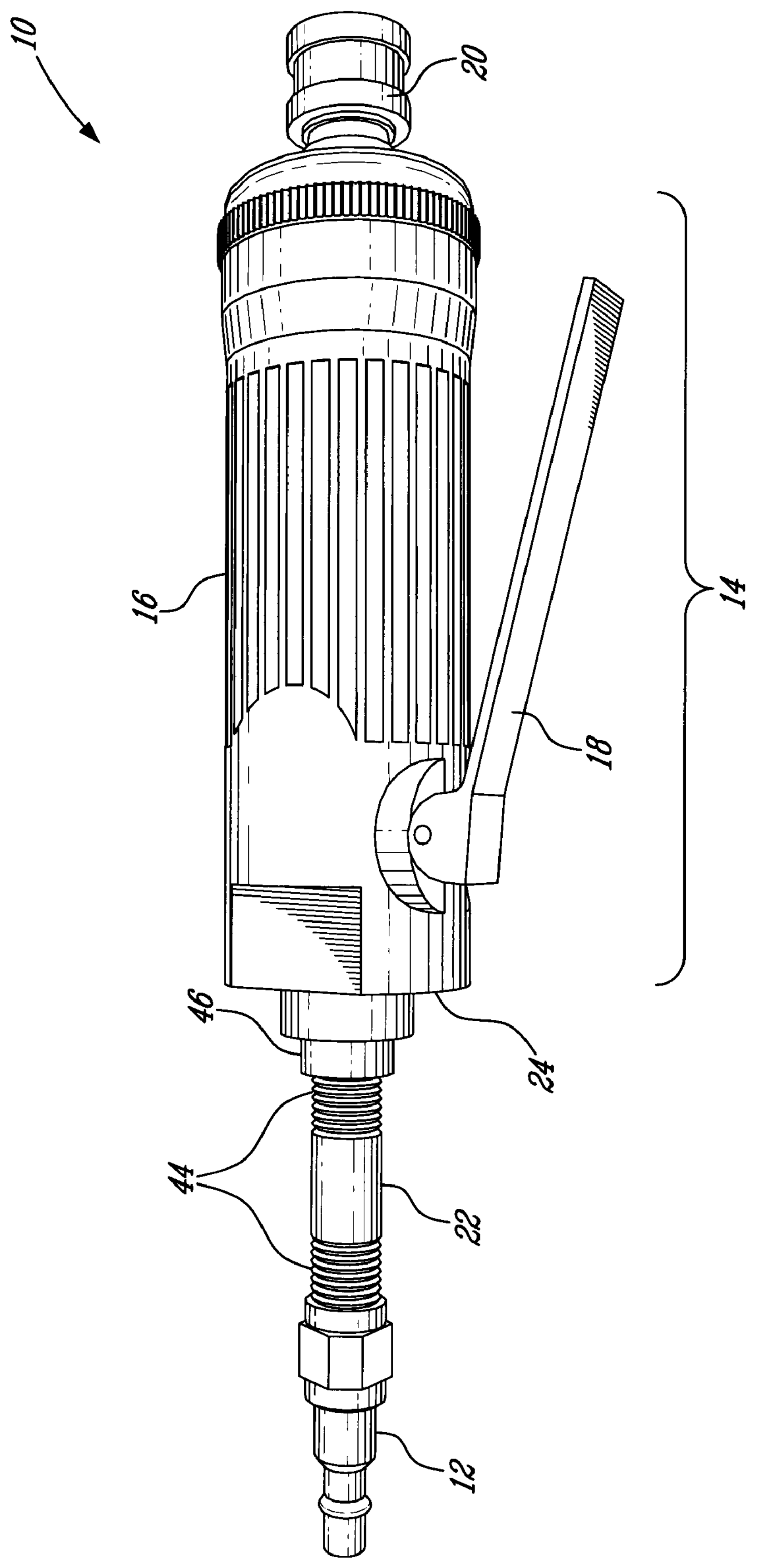
FIG. 1 PRIOR ART
FIG. 1 is a perspective side view of a prior art handheld pneumatic die grinder modified.

Referring to FIG. 1, the main parts of an existing die grinder, generally referred to using the reference numeral 10, will now be described. The die grinder 10 is a pneumatic handheld tool powered by pressurized fluid such as pressurized air for turning at high speed a tool attachment, such as a burr, stone, sanding disk, or the like (none shown), attached thereto to typically grind or cut away small amounts of metal from a workpiece, thereby polishing and buffing the latter. For example, a die grinder 10 of the type CP872 by Chicago Pneumatic™ may be used in accordance with an illustrative embodiment of the present invention. The die grinder 10 illustratively comprises a fluid intake adapter, such as an air adapter 12 mounted to a grinder body 14, which comprises a gripping area 16 and a hand operated throttle lever 18. A collet 20 is mounted to a tool attachment end (not shown) of the die grinder 10 for holding the tool attachment, which may be changed as required by the task at hand. In order to install the muffler of the present invention and as will be described herein below, an elongate coupler 22 is illustratively attached to the die grinder 10 at an exhaust end 24 provided on the grinder body 14 and comprising one or a plurality of exhaust passages (reference 25 in FIG. 5), through which released air flow exits. It is to be noted that although the previously mentioned die grinder 10 has been used to describe the invention, the use of such example is for illustrative purposes only and a person skilled in the art will understand that the inherent concept of the present invention is applicable to most types of pneumatic handheld tools.

Still referring to FIG. 1, in operation, high pressure air supplied at an inlet air conduit (not shown) attached to the air adapter 12 enters the die grinder 10 through the air adapter 12, passes through the coupler 22 and activates a pneumatic motor (not shown) located in the grinder body 14. The operator then presses the lever 18 towards the grinder body 14 to modify the flow of pressurized air entering the motor, thereby varying the rotational speed of the tool attachment. During use of the die grinder 10, which illustratively operates with a back gas exhaust system, high pressure air released from the motor goes from the interior of the die grinder 10 into the exhaust passage(s) (reference 25 in FIG. 5) at the exhaust end 24 and is expelled towards a rear end of the die grinder 10.

Figure 2:
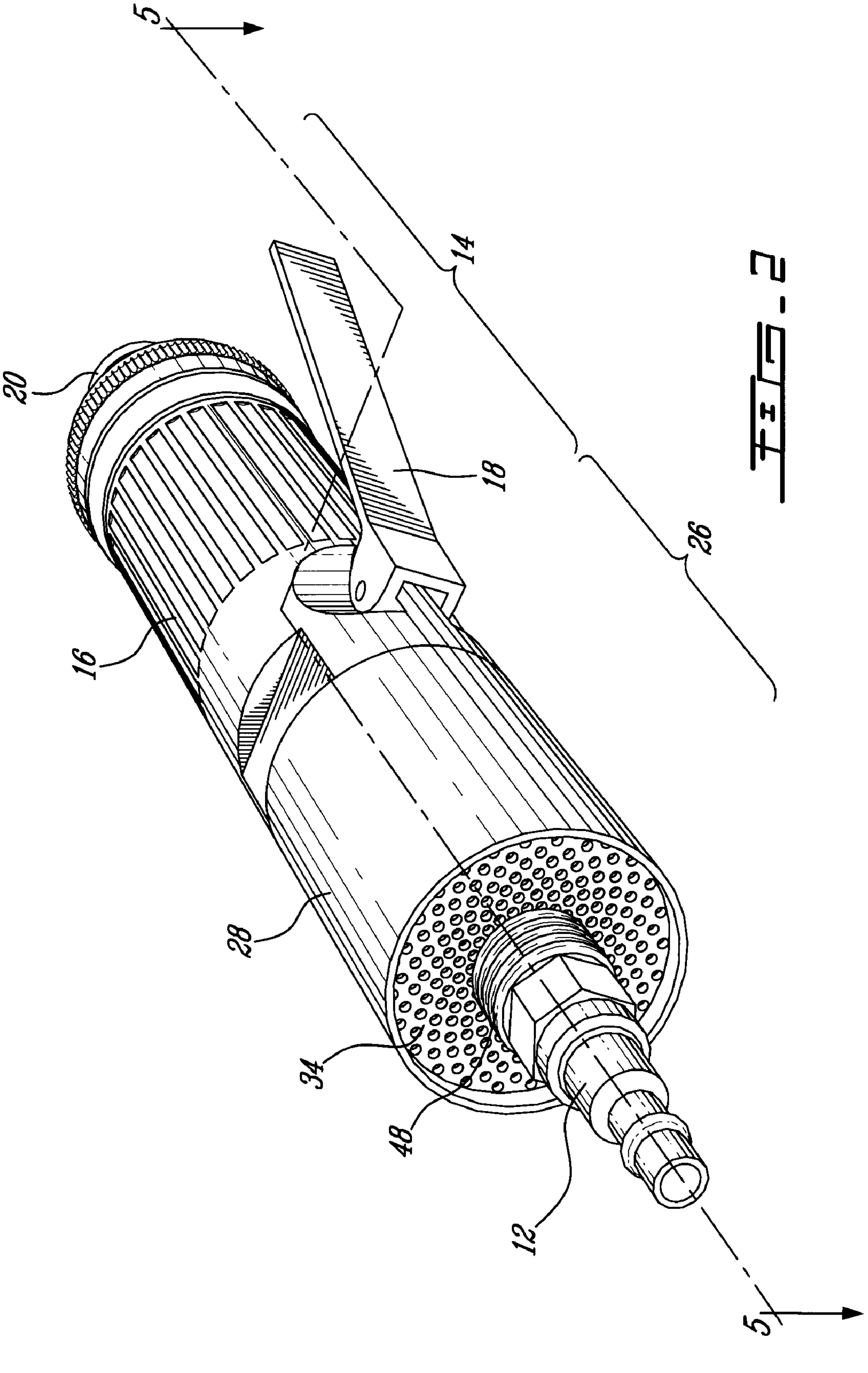
FIG. 2 is a right rear perspective view of the die grinder of FIG. 1 having a muffler mounted thereon, in accordance with an illustrative embodiment of the present invention.
Figure 3:
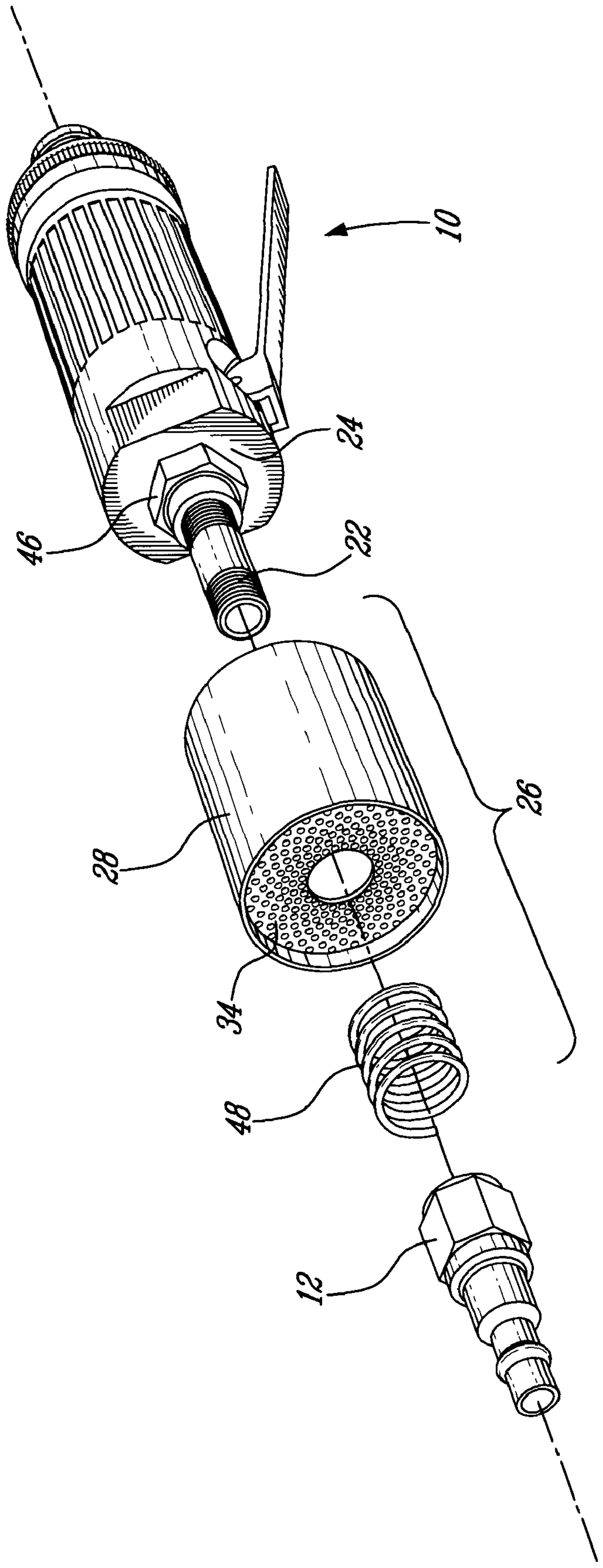
FIG. 3 is an exploded perspective view of the die grinder of FIG. 2.
Figure 4:
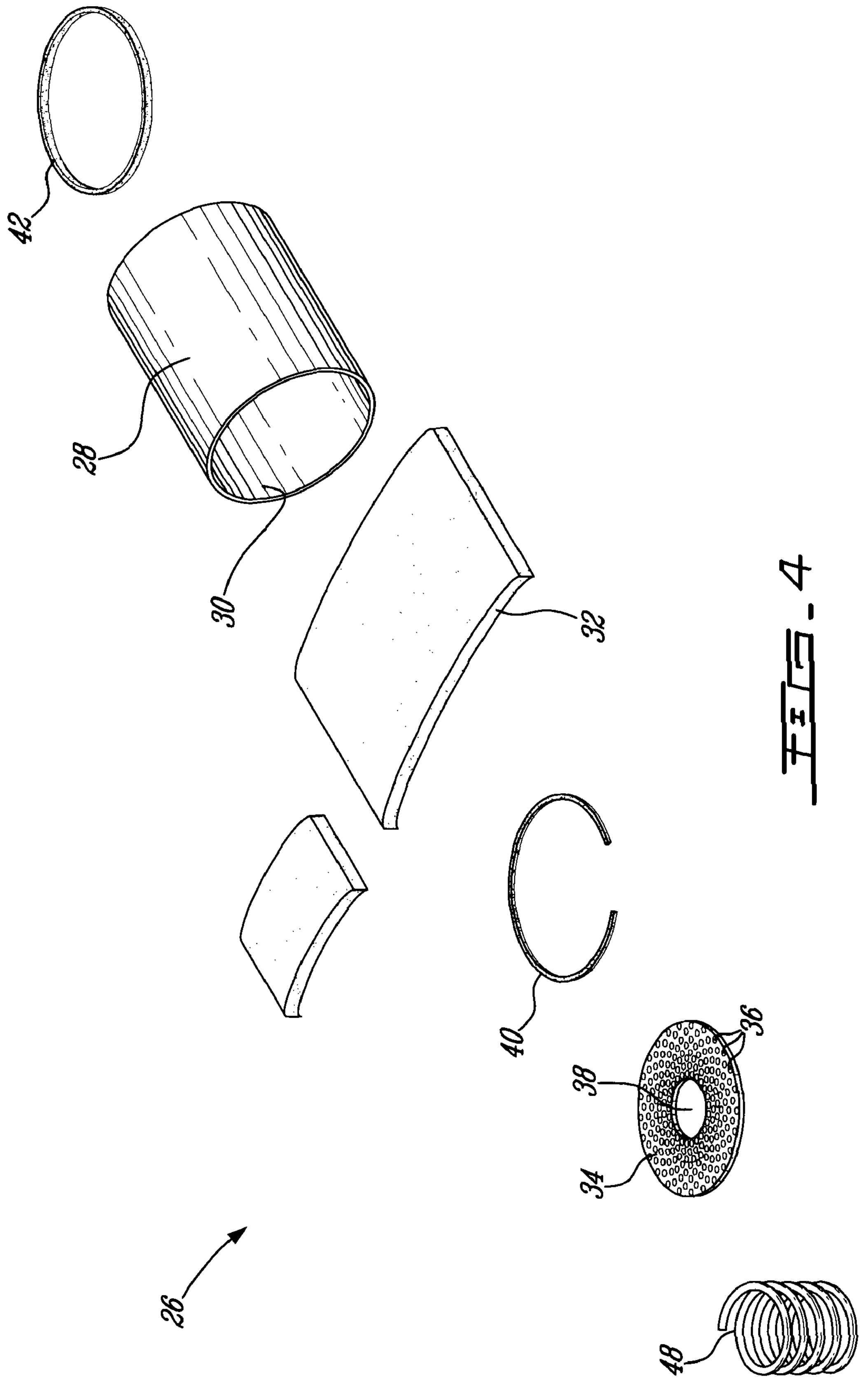
FIG. 4 is an exploded perspective view of components of the muffler of FIG. 2.
Figure 7A:
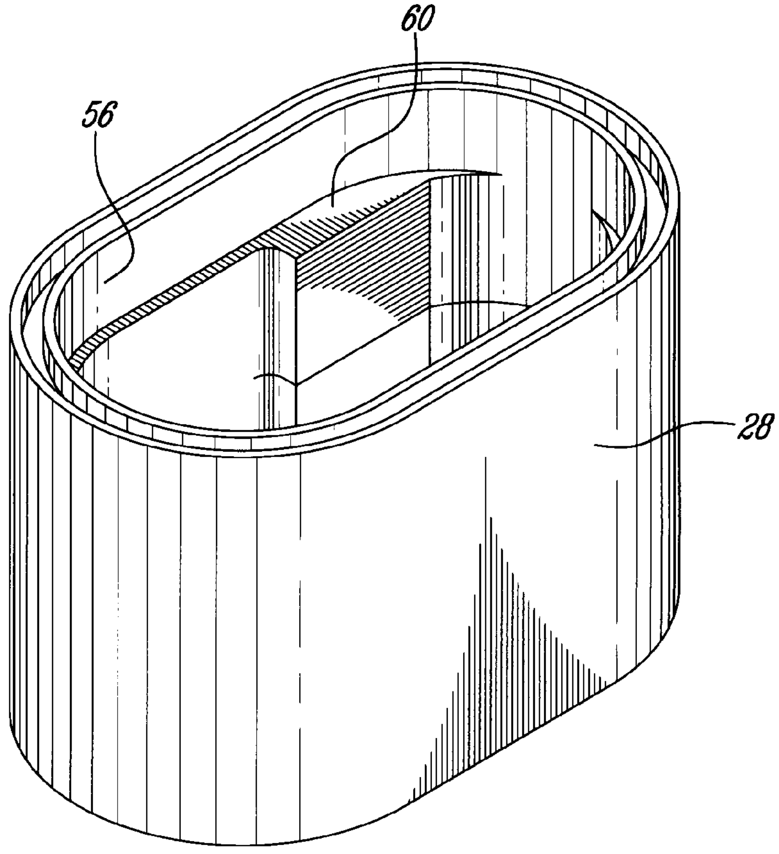
FIG. 7*a* is a bottom perspective view of the casing of FIG. 6.
Figure 7B:
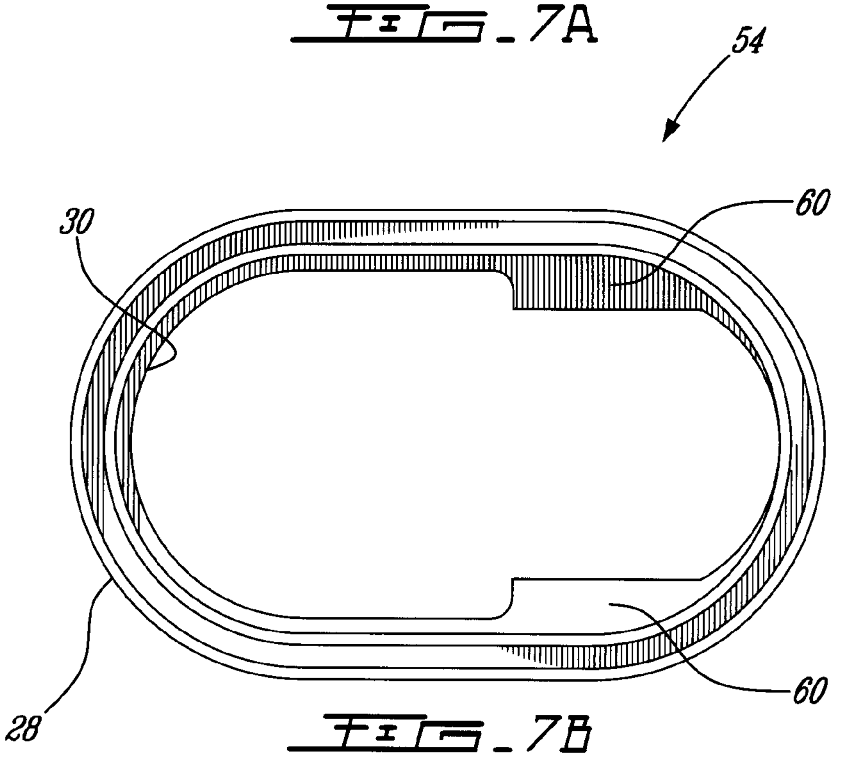
FIG. 7*b* is a rear bottom view of the casing of FIG. 6.

Referring now to FIG. 2, FIG. 3 and FIG. 4, a first illustrative embodiment of the muffler of the present invention, generally referred to using the reference numeral 26 will now be described. The muffler 26 comprises a casing 28, illustratively manufactured from a suitable material such as aluminum and having a cylindrical shape with a cross-section (e.g.

circular, as shown in FIG. 2, or elliptical cross-section, as shown in FIG. 7*b*) adapted to match the shape of the die grinder 10 or other pneumatic tool (e.g. impact wrench tool, etc, not shown) to which the muffler 26 is attached. An inner wall 30 of the casing 28 is illustratively lined with a thick layer of a material, for example sound insulating material 32, such as a felt pad allowing air flow. In this manner, the inner wall 30 of the casing 28 deflects the sound waves towards the insulating material 32, which dampens the acoustic waves and reduces the sonority of the noise as the displacement of acoustic waves in the insulating material 32 is much more difficult than in open air. When the insulating material 32 is in place against the inner wall 30 of the casing 28, a hollow space (not shown) is illustratively provided for inserting therein the coupler 22.

Still referring to FIG. 3 and FIG. 4, a plate 34, illustratively circular to complement the shape of the casing 28 and made of a metallic material, is further adapted to be mounted within the casing 28 at a first end face (not shown) thereof adjacent the air adapter 12. The plate 34 has formed therein a regular pattern of small perforations or vents as in 36 and a central passage 38 adapted to coaxially receive therein the coupler 22. For this purpose, the inner diameter of the passage 38 illustratively matches the outer diameter of the coupler 22. The total surface area represented by the perforations as in 36 is further selected according to the volume of air expelled at the exhaust passage(s) (reference 25 in FIG. 5) at the exhaust end 24. In particular, proper design of the perforations as in 36 prevents the released air from being restricted, thereby allowing air to be released without any build up in pressure. As a result, the torque of the die grinder 10 is not reduced and full workability thereof is ensured. For this purpose, the area of the perforations as in 36 is illustratively equal to a cross-section area of the inlet air conduit (not shown) supplying pressurized air to the die grinder 10.

Still referring to FIG. 3 and FIG. 4, when mounted at the first end face of the casing 28, the plate 34 illustratively lies in a vertical plane substantially perpendicular to a longitudinal axis (none shown) of the casing 28 with a periphery of the plate 34 abutting against a groove, step or the like (reference 58 in FIG. 6) provided on the inner wall 30, as discussed further herein below. In this manner, the insulating material 32 is protected by the plate 34 and held in place relative the casing 28. The plate 34 is further held in place relative to the casing 28 by a snap-ring 40, illustratively made out of spring steel and mounted between the inner wall 30 and the outer edge of the plate 34. An o-ring 42, illustratively made out of rubber, is also provided at the second end face (not shown) of the casing 28 opposite the first end face for providing an air tight connection between the muffler 16 and the die grinder body 14, when the muffler 16 is mounted to the latter.

Figure 5:
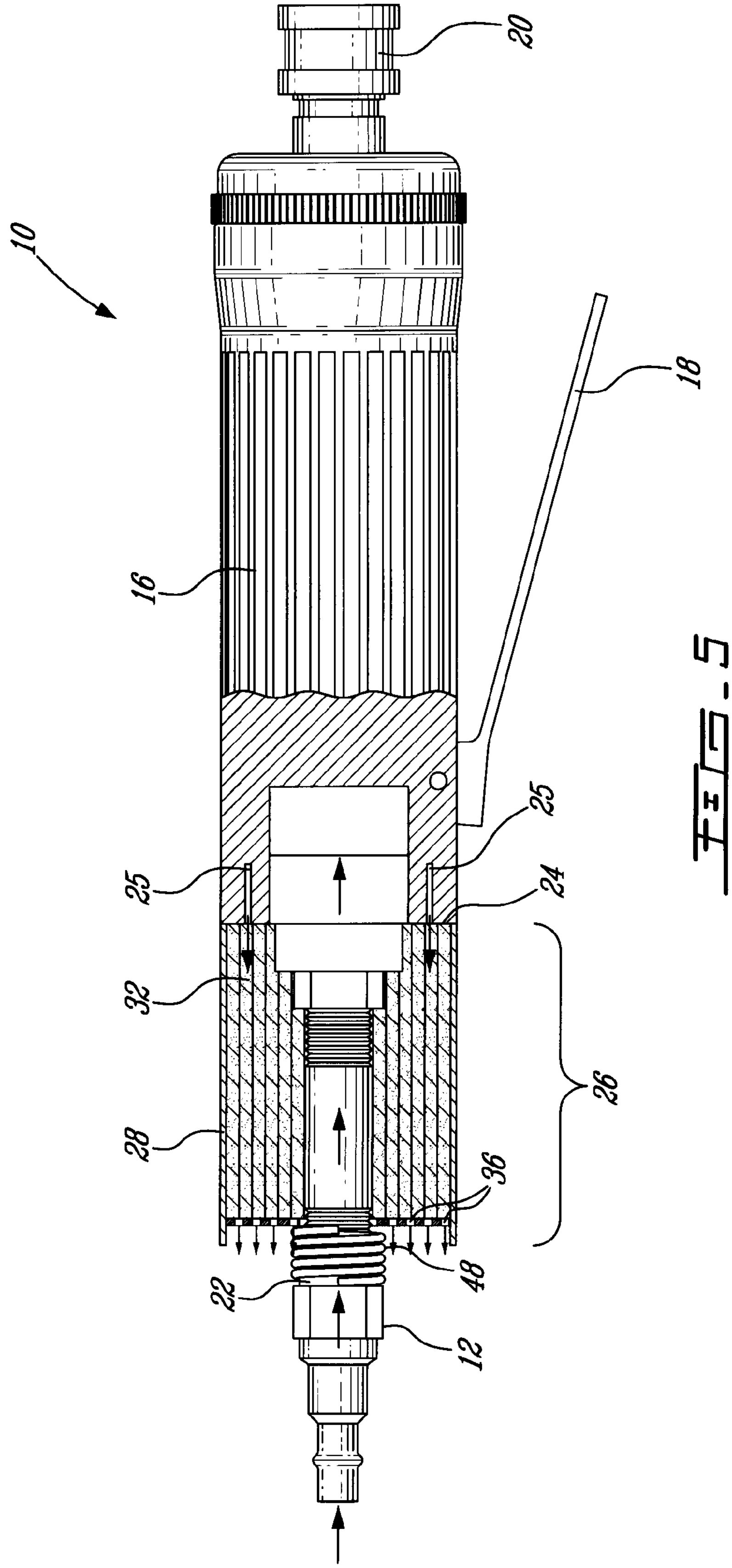
FIG. 5 is a sectional view taken along line 5-5 of FIG. 2.

Referring now to FIG. 5 in addition to FIG. 1, the coupler 22 illustratively has threaded ends as in 44, which are adapted to threadedly receive therein the air adapter 12 and a fastener, such as a bolt 46, provided adjacent the exhaust end 24 for securing the coupler 22 to the die grinder 10. Once the casing 28 has been sleeve mounted about the coupler 22 along a longitudinal axis (not shown) thereof for attachment of the muffler 26 to the die grinder 10, the air adapter 12 can then be secured to the free threaded end 44 of the coupler 22 to complete assembly of the die grinder 10. A biasing member, such as a spring 48, a bolt (if allowed by the length of the coupler 22), not shown, or the like, is illustratively mounted about the coupler 22 between the muffler 26 and the air adapter 12 in abutment against the outer surface of the plate 34. Although one may design a coupler 22 of given length that allows to screw or otherwise attach the air adapter 12 tightly against the muffler 26, use of the spring 48 advantageously enables mounting of the muffler 26 onto various tool types, such as different die grinders as in 10, having couplers as in 22 of different lengths. Indeed, the biasing action of the spring 48 presses the muffler 26 against the exhaust end 24, thereby adapting the axial positioning of the muffler 26 about the longitudinal axis (not shown) of the coupler 22 and ensuring that the exhaust passage(s) 25 remains covered in an air tight fashion by the muffler 26. In this manner, the released air flows from the exhaust passage(s) 25 at the exhaust end 24 through the muffler 26 to provide the desired muffling effect during exhaustion. Indeed, in order to achieve better muffling effect, no gap should be created between the muffler 26 and the exhaust passage(s) 25 so as to avoid high pressure air from being expelled at the exhaust passage(s) 25 and going through such gap without muffling. Thus, it is desirable for the muffler 26 to contact the exhaust end 24 as tightly as possible, as provided by the design of the present invention. When the released pressurized air goes from the interior of the die grinder 10 through the exhaust passage(s) 25 at the exhaust end 24, the air thus directly passes through the insulating material 32 (thereby reducing sonority) and through the perforations as in 36 to escape to the outer side of the die grinder 10.

Figure 6:
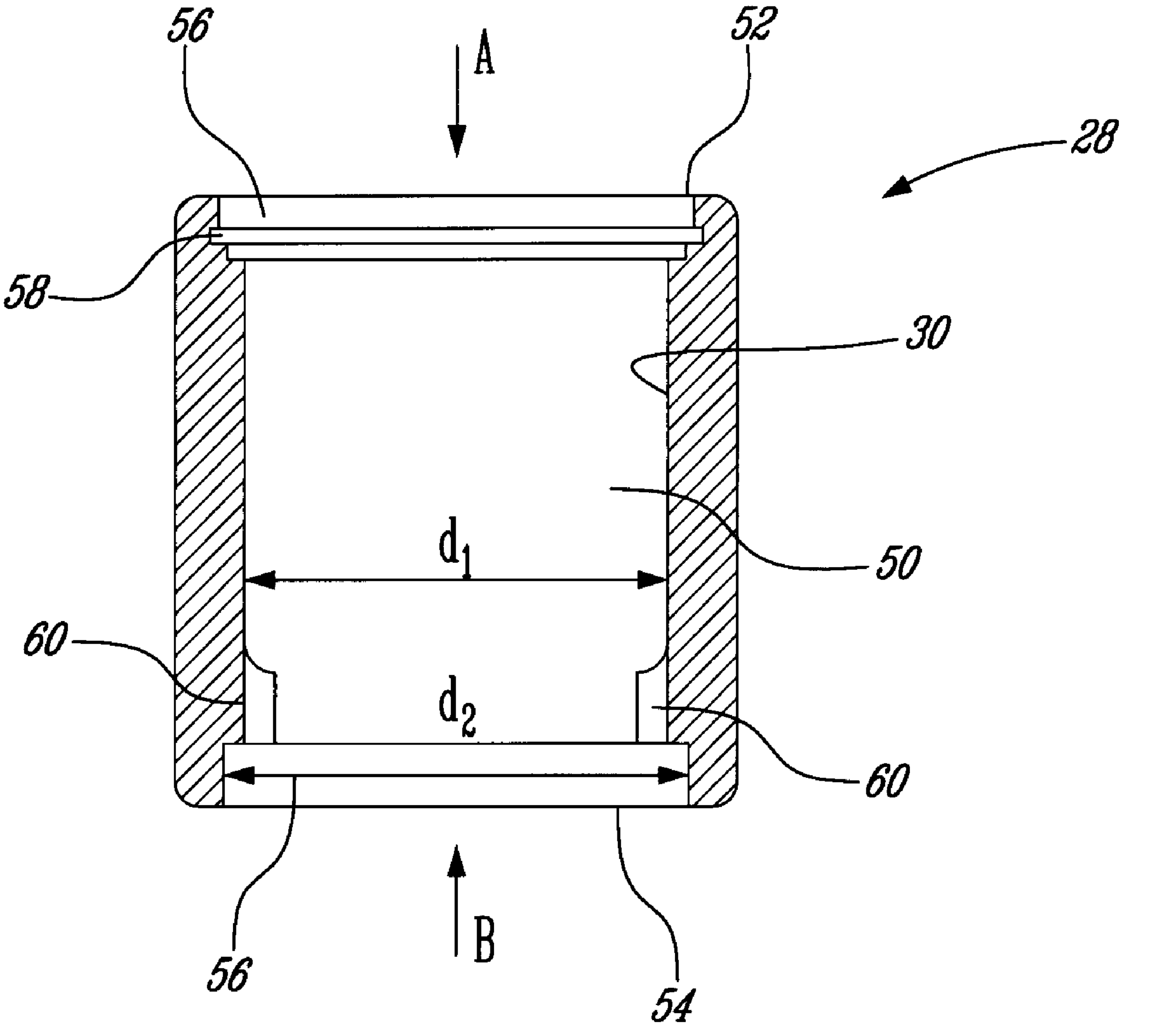
FIG. 6 is an elevated longitudinal cross-section view of a casing of a muffler in accordance to an alternative illustrative embodiment of the present invention.

Referring to FIG. 6, it can be seen from a cross-section view of the hollow casing 28 that the latter comprises a central bore 50 of a first diameter $d_1$ adapted to receive therein the insulating material (reference 32 in FIG. 4) and the coupler (reference 22 in FIG. 3). Adjacent a first end face 52 and a second end face 54 (adapted to be positioned adjacent the exhaust end, reference 24 in FIG. 1 of the die grinder, reference 10 in FIG. 1) of the casing 28, end sections as in 56 of the bore 50 are provided with a diameter $d_2$ greater than $d_1$. The first end face 52 is further provided with a groove 58 positioned adjacent the first end section 56 and adapted to receive therein the plate (reference 34 in FIG. 4). In particular, the plate 34 is inserted into the bore 50 adjacent the first end face 52 along the direction of arrow A and is retained within the groove 58. The snap-ring (reference 40 in FIG. 4) is then positioned about the plate 34 and the o-ring (reference 42 in FIG. 4) is similarly inserted at the second end face 54 along the direction of arrow B and retained within the end section 56.

Referring now to FIG. 7*a* and FIG. 7*b*, a locking mechanism in the form of a pair of opposite keying projections as in 60 are provided at the second end face 54 of the casing 28 (shown as having an elliptical cross-section for illustration purposes only) to lock the bolt (reference 46 in FIG. 3) in place relative to the casing 28 and thus prevent the bolt 46 from rotating within the casing 28 when the muffler (reference 26 in FIG. 3) is mounted about the coupler (reference 22 in FIG. 3). For this purpose, the projections as in 60 are illustratively designed to have a shape that conforms to that of the bolt 46. As a result, assembly and disassembly of the muffler 26 is simplified.

Referring back to FIG. 2, it can be seen that when the muffler 26 is mounted onto the die grinder 10, it covers the exhaust end 24 and abuts the grinder body 14, thereby enlarging the gripping area 16 to allow a better control of the tool using both hands rather than one. The use of both hands in turn reduces the user's fatigue and the handling of the die grinder 10 becomes more productive and secure. Also, as the materials used for the muffler components are lightweight, the extension of the gripping area 16 by adjoining the muffler 26 advantageously only adds a negligible weight to the overall tool. As a result, the die grinder 10 with muffler 26 is compact and light for providing simplified and comfortable workability to the operator in addition to being easy to assemble.

Still referring to FIG. 2, the present invention advantageously enables significant noise reduction during exhaustion without any loss of power, as shown by experimental results. Indeed, in order to measure the reduction in noise level achieved when the muffler 26 is added to a conventional pneumatic tool, such as a die grinder 10, tests have been carried out in different plants by a plurality (e.g. 80) of users with a plurality (e.g. 250) of mufflers as in 26 (e.g. CP872 model by Chicago Pneumatic™) each muffler 26 illustratively having a height of about 1 inch and ¾, a diameter of about 1 inch and 7/16 and a weight of about 39 g and being mounted to a standard handheld pneumatic die grinder as in 10. For each of the thus assembled die grinders 10 or other pneumatic hand held tools such as a pneumatic wrench tools, measurements showed that the reduction in noise level produced by the tool in use varies from 15 decibels to 18.7 decibels. In turn, the noise level at the operator's ear (i.e. at about 70 cm to 1 m from the tool, with an omnidirectional source and a plant having low reverberation) was estimated to be a reduction of about 11 decibels from the acoustic power level. Using a bisection factor of 5 decibels, it was then shown that a reduction of 15 decibels represents a decrease of about 87% of operator exposure to noise, while a reduction of 18.7 decibels represents a decrease of about 92% of operator exposure to noise.

Still referring to FIG. 2, another significant benefit of attaching the muffler 26 of the present invention to a pneumatic tool, such as a die grinder 10, is that, unlike prior art solutions, such as ear muffles, noise reduction can always be achieved by use of the muffler 26. Instead, in order to achieve the desired noise reduction, it is typically necessary for the ear muffles to be constantly worn by the operator (and subsequently removed when the work is done). However, from our understanding of human behavior, such constant attention to wear ear protection is often get neglected. Thus, the tool 10 having its own muffler 26 advantageously alleviates the need for operators to change their behavior (i.e. be more aware of additional equipment, such as ear muffles).

Still referring to FIG. 2, in addition to the noise reduction and extended gripping area 16, the muffler 26 for die grinder 10 offers additional advantages. Indeed, as seen from the above description, the muffler 26 is made of few components and is releasably mounted externally to the die grinder 10, thus facilitating the maintenance and replacement of parts for the user. Moreover, in addition to reducing noise, the insulating material 32 also serves as a filter for exhaust air contaminants, such as oil mainly, or possibly rust or dirt particles, that may come from the pressurized air conduits within the body 14 of the die grinder 10 and which are typically expelled through the exhaust passage(s) (reference 25 in FIG. 5) at the exhaust end 24. Indeed, as mentioned herein above, by providing the muffler 26 and especially the plate 34, pressurized air is advantageously directed through the muffler 26 to exit and diffuse through the perforations (reference 36 in FIG. 4) of the plate 34 instead of being expelled from the exhaust passage(s) 25 towards the operator's face.

Still referring to FIG. 2, although the above exemplary description was directed to a specific model (e.g. CP872 by Chicago Pneumatic™) of die grinder 10, persons skilled in the art will understand that the muffler 26 according to the present invention may be modified so as to be adapted to different models of die grinders as in 10, as mentioned herein above. The muffler 26 of the present invention may also be modified (e.g. by changing the shape thereof) to be adapted to air impact wrenches of the type used for installing and removing bolts on the wheels of a vehicle for example. As mentioned herein above, persons skilled in the art will also understand that the muffler 26 of the present invention may be removably installed onto other types of pneumatic handheld tools, achieving the same advantages of noise reduction and filtering of rust, dirt, oil or any other particles coming out of the rear entry of the pneumatic handheld tools.

Although the present invention has been described hereinabove by way of specific embodiments thereof, it can be modified, without departing from the spirit and nature of the subject invention as defined in the appended claims.

The invention claimed is:

1. A muffler for mounting to any one of a plurality of handheld pneumatic tools, each one of the plurality of tools comprising a body with a tool attachment end and an exhaust end, and an air adapter in fluid communication with an interior of the body for supplying pressurized air thereto, the muffler comprising:

a hollow casing adapted to be mounted to any one of the plurality of tools with a first face of said casing adjacent the air adapter and a second face of said casing opposite the first face adjacent the exhaust end;

a layer of insulating material lining an inner wall of said casing; and a biasing member mounted between the air adapter and said first face, said biasing member biasing said second face against the exhaust end, wherein said biasing member comprises a spring.

2. The muffler of claim 1, wherein said biasing member biasing said second face against the exhaust end allows to direct a flow of exhaust air from the exhaust end through said lined casing, thereby reducing a level of noise at the exhaust end.

3. The muffler of claim 1, further comprising a selected one of a plurality of elongate couplers, each one of said plurality of couplers having a length adapted to be accommodated by a corresponding one of the plurality of tools and comprising a first end adapted to be attached to the exhaust end of said corresponding tool and a second end opposite the first end adapted to be attached to the air adapter of said corresponding tool.

4. The muffler of claim 3, wherein said hollow casing is sleeve mounted about said coupler of said corresponding tool.

5. The muffler of claim 4, wherein said biasing member is mounted about said coupler of said corresponding tool and further wherein said biasing member biases said second face against the exhaust end of said corresponding tool for adapting an axial positioning of said casing about a longitudinal axis of said coupler to said length of said coupler.

6. The muffler of claim 2, wherein said exhaust air flows through a plurality of exhaust passages provided at the exhaust end.

7. The muffler of claim 2, wherein said insulating material filters contaminants from said exhaust air expelled at the exhaust end.

8. The muffler of claim 3, wherein said casing is a cylinder having an open end at said first face.

9. The muffler of claim 8, wherein said cylinder has a circular cross-section.

10. The muffler of claim 8, wherein said cylinder has an elliptical cross-section.

11. The muffler of claim 8, further comprising a plate adapted to be mounted within said casing at said first face for partially closing said open end.

12. The muffler of claim 11, wherein the pressurized air is supplied to the interior of the body via an inlet conduit attached to the air adapter.

13. The muffler of claim 12, wherein said plate comprises a plurality of perforations, a total area of said plurality of perforations equal to a cross-section area of said inlet conduit.

14. The muffler of claim 11, wherein said plate comprises a central passage adapted to receive said coupler therein coaxially with a longitudinal axis of said casing.

15. The muffler of claim 1, wherein the body comprises a gripping area between the tool attachment end and the exhaust end, and further wherein said casing provides an extension of said gripping area.

16. The muffler of claim 11, further comprising a snap-ring mounted adjacent said first face between said inner wall and an outer edge of said plate for holding said plate in place relative to said casing.

17. The muffler of claim 1, further comprising an o-ring mounted at said second face for providing an air tight connection between the muffler and the tool at the exhaust end.

18. The muffler of claim 1, further comprising a fastener at the exhaust end and a pair of keying projections provided along said inner wall adjacent said second face and adapted for mating with said fastener for preventing a rotation thereof within said casing.

* * * * *